(12) United States Patent
Owen et al.

(10) Patent No.: US 6,339,878 B1
(45) Date of Patent: Jan. 22, 2002

(54) METHOD OF REPAIRING AN AIRFOIL

(75) Inventors: William D. Owen, Manchester, CT (US); Robert Baumgarten, Palm Beach Gardens, FL (US); Eric William Malmborg, Marlborough, CT (US); Christopher Palazzini, Windsor, CT (US); Frank E. Palko, Old Saybrook, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/536,364

(22) Filed: Mar. 27, 2000

(51) Int. Cl.$^7$ ............................................... B23P 15/00
(52) U.S. Cl. ...................................... 29/889.1; 29/889.7
(58) Field of Search ........................... 29/889.1, 889.7, 29/402.03, 402.05, 402.06, 402.08, 402.09, 402.11, 402.13, 402.18, 407.01

(56) References Cited

U.S. PATENT DOCUMENTS

| | | |
|---|---|---|
| 3,574,924 A | 4/1971 | Dibble .......................... 29/401 |
| 4,108,573 A | 8/1978 | Wagner .................. 416/236 A |
| 4,118,147 A | 10/1978 | Ellis ............................. 416/230 |
| 4,178,667 A | 12/1979 | Stevens et al. ......... 29/156.8 B |
| 4,326,833 A | 4/1982 | Zelahy et al. ............. 416/96 R |
| 4,409,462 A | 10/1983 | Jahnke ................. 219/121 ED |
| 4,613,744 A | 9/1986 | Fraser ......................... 219/200 |
| 4,873,751 A | 10/1989 | Walker et al. ......... 29/156.8 B |
| 4,883,216 A | 11/1989 | Patsfall ........................ 228/119 |
| 4,934,583 A | 6/1990 | Patsfall ....................... 228/44.3 |
| 5,033,938 A | 7/1991 | Fraser et al. ................. 416/224 |
| 5,092,942 A | 3/1992 | Fraser et al. .............. 148/12 R |
| 5,185,924 A | 2/1993 | Fraser ........................ 29/889.1 |
| 5,197,190 A | 3/1993 | Coolidge .................... 29/889.1 |
| 5,197,191 A | 3/1993 | Dunkman et al. ......... 29/889.1 |
| 5,511,949 A | 4/1996 | Thore ..................... 416/213 R |
| 5,778,960 A | 7/1998 | Jackson et al. ............... 164/98 |
| 5,813,593 A | 9/1998 | Galaske, Jr. ............... 228/112.1 |
| 5,867,885 A | 2/1999 | Bales et al. .................... 29/559 |

FOREIGN PATENT DOCUMENTS

| | | |
|---|---|---|
| EP | 0 279 058 B1 | 11/1991 |
| WO | WO 95/29037 | 11/1995 |

*Primary Examiner*—I Cuda-Rosenbaum
(74) *Attorney, Agent, or Firm*—Richard D. Getz

(57) ABSTRACT

A method for repairing an airfoil is provided that includes the steps of: (a) determining repair regions of the airfoil that are likely to be damaged during a period of operation; (b) creating a stress profile for the airfoil that considers dynamic, steady-state, and residual stresses; (c) selecting a replacement section patch line using the stress profile and the determination of those regions likely to be damaged during operation; (d) providing an airfoil replacement section with a predetermined shape having a bond surface that substantially mates with the patch line; (e) removing a portion of the airfoil up to the patch line; (f) bonding the airfoil replacement section to the airfoil along the patch line; and (g) shaping the patched airfoil.

12 Claims, 2 Drawing Sheets

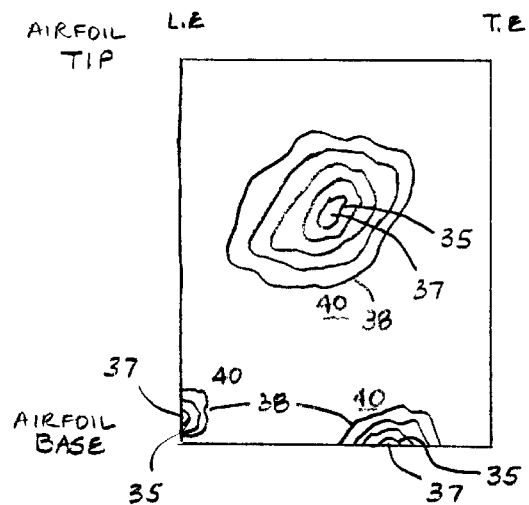
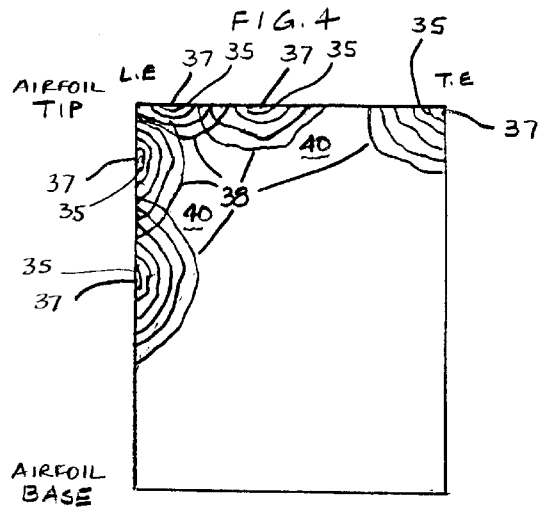
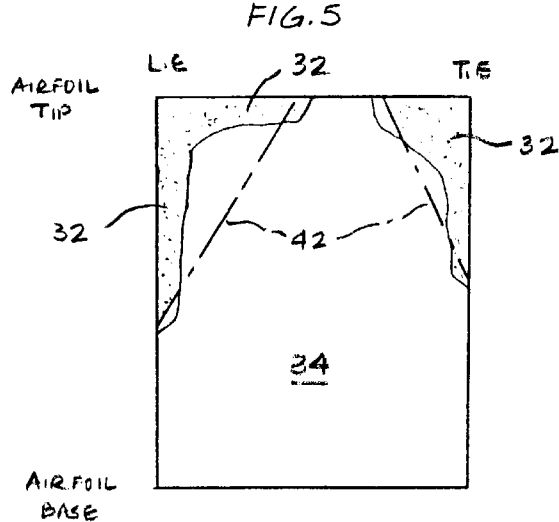
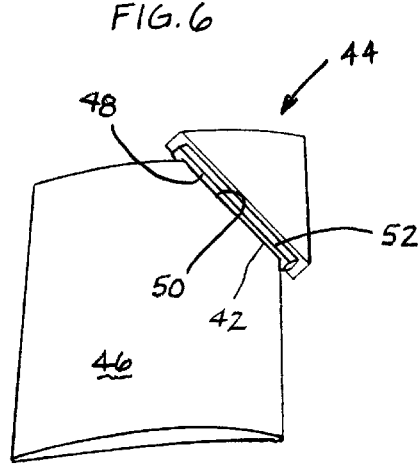

METHOD OF REPAIRING AN AIRFOIL

BACKGROUND OF THE INVENTION

1. Technical Field

This invention relates to rotor blades having utility in a turbine engine in general, and to methods of repairing rotor blades used in gas turbine engines in particular.

2. Background Information

Rotor assemblies are utilized in the fan, compressor, and turbine sections of a gas turbine engine. Each rotor assembly includes a plurality of rotor blades distributed around the circumference of a disk. In a conventional rotor assembly, the rotor blades are attached to the disk by mechanical means such as a "fir-tree" type attachment where a fir-tree shaped blade root is received within a mating recess in the disk. Alternatively, the rotor blades can be integrally attached to the disk by metallurgical attachment or be machined from a forging. The resultant integrally bladed rotor (IBR) obviates the need for blade attachment hardware and the weight associated therewith. IBR's also permit the use of a rotor disk smaller, and therefore lighter, than would be acceptable in a comparable rotor assembly having a mechanical attachment scheme.

Because of the considerable cost and time incurred in the manufacture of a rotor blade, it is preferable to repair rotor blades when possible rather than replace them. This is particularly true in the case of an IBR. Repair of a rotor blade airfoil is typically necessitated by wear that normally occurs during operation. Airfoil repairs can also be necessitated, however, by foreign object damage (FOD) that occurs when a foreign object strikes an airfoil. If the extent of the wear or damage (hereinafter referred to generically as damage) is below a predetermined threshold, it may be possible to "blend" the area of the airfoil back to within acceptable standards. Blending usually involves machining the damaged area back to within acceptable tolerances. If the damage exceeds the blending threshold, conventional practice dictates that the damage be evaluated to determine the appropriateness of a "patch" repair wherein the damaged portion of the airfoil is removed and replaced.

Anytime a portion of an airfoil is removed and replaced, the repair must not compromise the integrity of the airfoil. The useful life of an airfoil (an indicator of integrity) is typically determined by evaluating the airfoil for existing stresses or those experienced during operation. Stresses experienced during operation will regionally vary within the airfoil as a function of rotational speed, operating environment, etc. This is particularly true in certain types of airfoils; e.g., low aspect ratio airfoils where the length over width ratio is approximately two (2) or less. The principal types of stresses within an airfoil experienced during operation can be described in terms of steady-state stresses and vibratory related stresses. Steady-state stresses are a function of centrifugal loading, gas pressure, and thermal gradients and can be considered a constant for purposes of determining acceptable stress limits within a region of an airfoil at any given rotational speed. Vibratory related stress, in contrast, is a function of the environment in which the airfoil operates. An airfoil used within a gas turbine engine is subjected to periodic and non-periodic excitations present within the environment, and the excitations collectively produce the vibratory related stresses. Periodic excitations can be problematic if they coincide with a natural frequency of the airfoil. The resonant condition that results from the coincidence of the frequencies can result in undesirable oscillatory displacements that produce periodic-type vibratory related stresses. Non-periodic vibration responses such as "flutter" or "buffeting" are independent of the resonant frequency(ies) of the airfoil. Flutter, for example, is a function of aerodynamic damping. If aerodynamic forces acting on an airfoil are such that energy is added to rather than dissipated from the airfoil, the additional energy can cause non-periodic displacement of a portion of the airfoil (i.e., "flutter") that causes the airfoil to experience non-periodic-type vibratory related stress.

Another type of stress that must be considered in a patch repair is the localized residual stresses that are created when the patch is bonded to the airfoil. Bonding processes such as welding typically impart considerable thermal energy into the substrates to be joined. The rate at which the thermal energy is removed from the substrates during and after the joining process is generally not uniform (e.g., exterior surface regions cool at a faster rate than interior regions), consequently precipitating the formation of residual tensile stresses in the area of the joined substrate subjected to the thermal energy. The additional stress attributable to the joining process is additive to the vibratory and steady-state stresses discussed above. Hence, there is value in minimizing the length of a bond joint. This is particularly true in airfoil applications where a variety of vibratory modes exist and the bond line is likely to extend across multiple node lines and thereby extend through a variety of regions subjected to different stresses. There are mechanisms available to reduce stress along a bond line such as peening and/or heat treatment. Stress reducing steps add cost to the repair and in some instances it may not be possible to limit the effects of the stress reducing process to the regions desired.

In short, airfoils utilized within a gas turbine engine typically experience a variety of different stresses generally describable in terms of steady-state and dynamic stresses. In many instances, therefore, it is not enough to consider only those stresses that relate to modes of vibration associated with the natural frequencies of the airfoil, and it would be advantageous to have a method for repairing rotor blades that accounts for all of the stresses that an airfoil will typically experience during operation, including steady-state stresses, vibratory related stresses, and residual stresses.

DISCLOSURE OF THE INVENTION

It is, therefore, an object of the present invention to provide a method of repairing a rotor blade that accounts for the multiple types of stresses the airfoil typically experience during operation.

It is another object of the present invention to provide a repair method that can be standardized wholly or in part to facilitate the repair process.

According to the present invention, a method of repairing an airfoil is provided that includes the steps of: (a) determining repair regions of the airfoil that are likely to be damaged during a period of operation; (b) creating a stress profile for the airfoil that considers dynamic, steady-state, and residual stresses; (c) selecting a replacement section patch line using the stress profile and the determination of those regions likely to be damaged during operation; (d) providing an airfoil replacement section with a predetermined shape having a bond surface that substantially mates with the patch line; (e) removing a portion of the airfoil up to the patch line; (f) bonding the airfoil replacement section to the airfoil along the patch line; and (g) shaping the patched airfoil.

The determination of which airfoil regions are likely to be damaged ("damage regions") during a period of operation is made using a predictive method. Empirical data that can be used to predict damage may be collected from numerous sources including similar existing engines, test engines of the same type, or in-service engines of the same type. Collectively, empirical data provides a reliable mechanism for predicting which areas of an airfoil are likely to be damaged, the type of damage, and the nature of the required repair. An empirically derived damage map provides a means for evaluating a potential patch line. Other predictive methods may be used alternatively to derive damage maps.

A stress profile is the product of determining the stresses that the airfoil will likely experience during operation including steady-state stresses, dynamic stresses, and residual stresses present from joining processes. Steady-state stresses may be defined as those resulting from centrifugal loading, gas pressure loading, and thermal gradients. Dynamic loading involves both periodic and non-periodic loading. Periodic loading describes those loads that the airfoil experiences "n" number of times during a rotation of the rotor assembly. Non-periodic loading encompasses all remaining dynamic loadings, such as flutter and buffeting.. In all cases, the stresses attributable to the various influences are collectively mapped as a function of position on the airfoil and rotational speed, collectively forming the stress profile.

The patch joint line is selected using both the predicted damage map and the stress profile. As a first step, a particular damage region on an airfoil might be selected as a candidate for a patch repair. Potential patch lines for that region are evaluated for stresses using the stress profile. In some instances, in may not be possible to use a proposed patch line because stresses encountered at some point along the patch line exceed an acceptable stress level. In that case, if it is possible to select a new patch line for the same damage region, the evaluation process is repeated for the new patch line. If, on the other hand, it is not possible to define an acceptable patch line for a given region, the region may have to be redefined using the predicted damage map (e.g., capture 75% of the damage region rather than 85%) and the process repeated for the redefined region until an acceptable patch line is determined.

One of the advantages of the present method is that it provides an airfoil repair that considers multiple stress types rather than just dynamic stresses attributable to periodic-type vibrations. Non-periodic dynamic loading and/or steady-state loading in many cases causes significant stresses that may be equal to or greater than those attributable to periodic loading. In those cases, positioning a patch line along or adjacent a natural frequency node line may run afoul of high stress regions associated with non-periodic modes of vibration like flutter and/or high stress regions attributable to steady-state loading. The present method also addresses different stresses typically associated with particular areas of an airfoil. For example high cycle fatigue can cause an outer airfoil corner to fail under certain circumstances. In that instance, the highest stress associated with the failure would be at the failure line, not at the corner itself where the displacement is the greatest. A repair method that equates stress with displacement may not provide a viable repair in that instance.

Another advantage of the present invention is that a patch repair is provided that can be used to increase the useful life of a rotor blade. The empirically derived or otherwise predicted damage data used under the present method to select a patch line enables the person developing the repair to select a patch line that encompasses as much of an anticipated damage region as is possible without unnecessarily increasing the length of the patch joint. As a result, the number of damage areas likely to be repairable by a particular patch is greater and the useful life of the airfoil likely extended.

Another advantage of the present invention is that a repair method is provided that allows for standardization without having to include unnecessary portions of the airfoil. Some prior art patch repairs disclose an all-encompassing patch sized to ensure that all potential damaged portions of a blade are replaced by a single patch. Such a patch is likely to include portions of the airfoil less apt to be damaged than others. The present method uses predicted damage data and a stress profile to judiciously define a patch geometry that captures the desired damage region(s).

A significant benefit of the present method lies in the cost of the replacement section. Using an entire airfoil as a replacement section, or even a substantially sized replacement section will drastically increase the cost of the repair thereby minimizing the economic benefit of the repair. Larger replacement sections are likely to have greater geometric complexity and consequent manufacturing cost. An advantage of the present invention is its ability to judiciously determine an optimum replacement section.

A judiciously determined optimum replacement section is also likely to require a relatively short length joint. Because any joining process will have some inherent probability of defect inclusion within the joint region, the ability of the present method to provide a repair with a relatively short length joint is a further advantage.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 3 is an illustrative plot of steady-state stresses for a rotor blade.

FIG. 4 is an illustrative plot of dynamic stresses for a rotor blade.

FIG. 5 is an illustrative plot of damage location based on empirical data and potential patch lines for replacement sections.

FIG. 6 is a diagrammatic view of a replacement section.

DETAILED DESCRIPTION OF THE INVENTION

Figure 1:
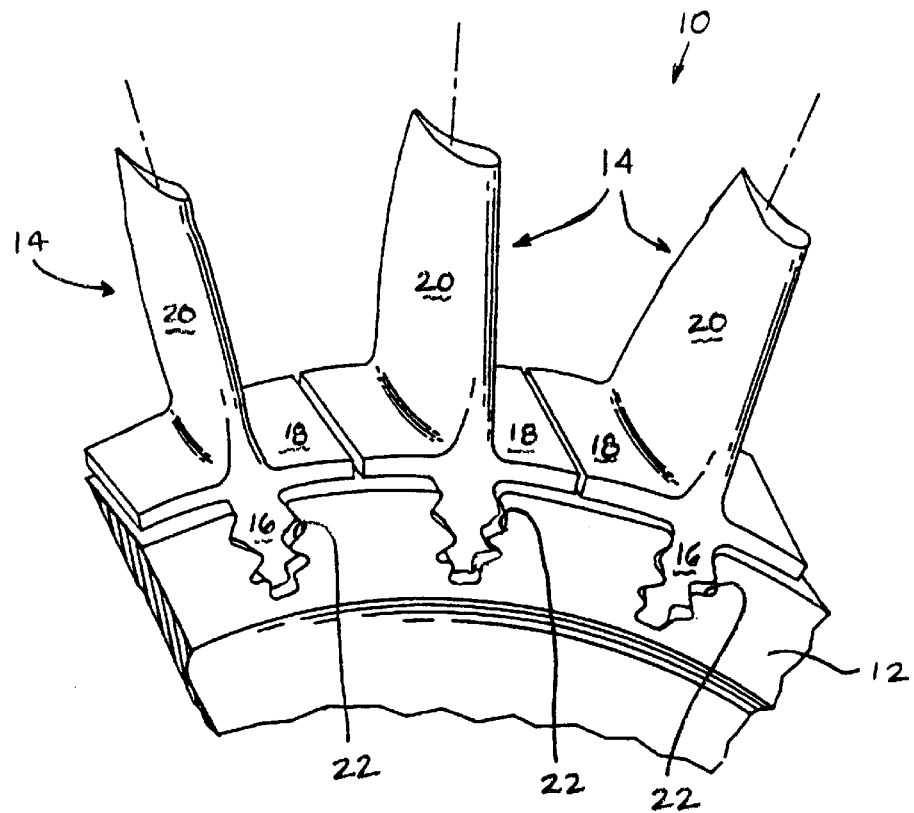
FIG. 1 is a diagrammatic partial view of rotor blades attached to a rotor disk by conventional mechanical means.
Figure 2:
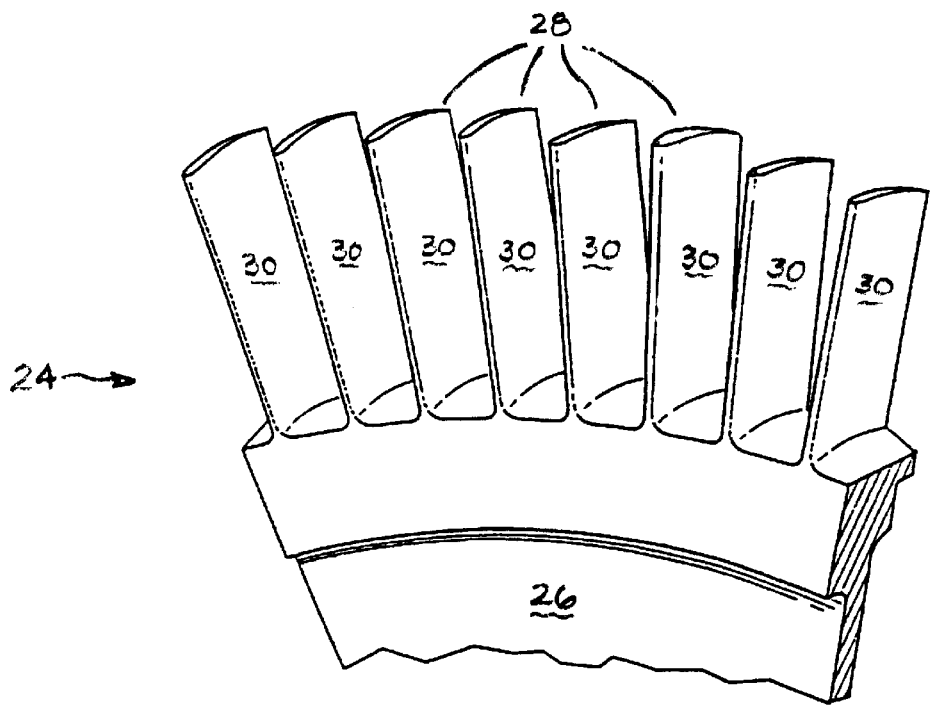
FIG. 2 is a diagrammatic partial view of rotor blades integrally attached to a rotor disk.

Referring to FIG. 1, a conventional rotor assembly 10 includes a disk 12 and a plurality of rotor blades 14. Each rotor blade 14 includes a root 16, a platform 18, and an airfoil 20. The root 16 of each blade 14 is received within a channel 22 disposed on the circumference of the disk 12, and thereby attached to the disk 12. Referring to FIG. 2, an integrally bladed rotor ("IBR") 24 includes a disk 26 and a plurality of rotor blades 28 extending out from the circumference of the disk 26. Each rotor blade 28 includes an airfoil 30 and is integrally attached to the disk 26 by metallurgical bond. Conventional rotor assemblies and EBR's are used in gas turbine engine fan, compressor and turbine sections.

During operation of a gas turbine engine, rotor blade airfoils often sustain damage as a result of foreign object strikes, erosion, thermal degradation, high cycle fatigue, etc. In many cases, a rotor blade airfoil can be repaired and returned to service. Such a repair when physically and economically possible, provides considerable advantage because of the cost of replacing the blade relative to repairing it. Repairs that can be used on IBR's are particularly advantageous because of the high cost of manufacturing an IBR The present method of repairing an airfoil includes the steps of: (a) determining regions of the airfoil that are likely to be damaged during a period of operation; (b) creating a stress profile for the airfoil that considers dynamic, steady-state, and residual stresses; (c) selecting a replacement section patch line using the airfoil stress profile and the determination of those regions likely to be damaged during operation; (d) providing an airfoil replacement section with a predetermined shape having a bond surface that substantially mates with the patch line; (e) removing a portion of the airfoil up to the patch line; (f) bonding the airfoil replacement section to the airfoil along the patch line; and (g) shaping the airfoil.

Referring to FIG. 5, empirical data is used to predict the regions 32 of an airfoil 34 that are likely to be damaged and the type of damage likely to be encountered by a rotor blade in a particular application. That empirical data is then used to identify one or more damage regions 32 on the airfoil 34 that are candidates for a replacement section repair.

Referring to FIGS. 3 and 4, the expected residual stresses and those attributable to steady-state and dynamic loading are individually determined and collectively mapped for the airfoil at hand. The techniques for individually determining the stresses are known in the art and will not be described here other than to state that stresses created by periodic, non-periodic, and steady-state loading and any residual stresses created during the joining process are all considered under the present method. FIG. 3 contains an airfoil stress plot illustrative of stresses typically associated with steady-state loads applied to an airfoil. FIG. 4 contains an airfoil stress plot illustrative of stresses typically associated with dynamic loads applied to an airfoil. In both FIGS. 3 and 4, the stress bands are oriented from inner to outer, where the inner-most band 35 surrounds the highest stress level region 37 and the outer-most band 38 distinguishes the change in stress from the ambient stress region 40. The stress level regions decrease in magnitude going from the inner-most region 37 to the ambient stress region 40.

Referring to FIG. 5, a potential replacement section repair is developed by electing a patch line 42 (shown in phantom) across the airfoil 34 that would allow for the removal and replacement of all or part of one of the empirically derived damage regions 32. The potential patch line 42 is then evaluated using the airfoil stress profile. The evaluation involves comparing the expected collective stress at any given point along the patch line 42 to that of a predetermined stress value. If the expected collective stress value is below the predetermined stress value, or some predetermined percentage of it, then that point on the potential patch line 42 is acceptable. Other points on the patch line 42 are subsequently evaluated in like manner until a complete stress picture of the potential patch line 42 is developed. If a portion of the patch line 42 exceeds the predetermined stress value, then the patch line 42 will be altered to avoid the high stress region. The process repeats itself until a patch line 42 is determined that extends through regions of acceptable stress.

Referring to FIG. 6, the shape of the replacement section 44 is chosen to reflect the position of the patch line 42 and the shape of the airfoil 46 portion to be removed. The replacement section 44 is shaped in the contour of the airfoil portion to be removed, including a surface 48 contoured to substantially match the airfoil surface 50 at the patch line 42. The replacement section 44 is preferably oversized for machining purposes. If, for example, the geometry or position of the replacement section 44 relative to the airfoil 46 is not perfect but still within acceptable bounds, the excess material of the oversized replacement section 44 enables the airfoil 46 to be shaped into the preferred geometry. In the most preferred embodiment, a portion 52 of the replacement section 44 extending along the surface 48 to be joined to the airfoil 46 along the patch line 42 is sized substantially the same as the airfoil along the patch line, thereby eliminating substantially all of the excess material adjacent the patch line surface 48. It is our experience that machining a portion 52 of the oversized replacement section 44 to substantially the same size as the airfoil at the patch line facilitates the bonding process by decreasing the thickness of the substrates to be joined. The replacement section 44 shown in FIG. 6 is shown in exaggerated proportions to better illustrate the features of the replacement section 44.

Once an acceptable replacement section patch line 42 and replacement section 44 are selected for a particular airfoil repair, repairs for that airfoil 46 are thereafter substantially standardized. Any airfoil 46 that is subjected to repairable damage within a damage region can be repaired by cutting along the patch line 42 and removing the predetermined geometry damage section. Any cutting method that leaves a surface 50 to which the replacement section 44 can be bonded is acceptable. In some instances, it may be advantageous to remove the damaged section at a position away from the patch line 42 using a rough cut method and subsequently arrive at the patch line 42 using a more refined removal technique.

After the above described preparations to the airfoil 46 are complete, the standardized replacement section 44 is bonded to the airfoil 46 along the patch line 42 using a joining process (e.g., welding) that is amenable to the airfoil 46 alloy and geometry. In most cases, the joint region is also subjected to heat treatment and/or surface treatment processes to produce desirable material properties at the joint line. Heat treatment and surface treatment processes will vary depending on the application at hand. Laser shock peening is an example of an acceptable surface treatment process for some airfoil alloys. In all cases, the airfoil 46 is shaped back to its original contour by removing excess material present at the joint or on the replacement section 44. The order of the heat treatment, surface treatment, and shaping processes will depend on the application at hand and can be altered.

Although this invention has been shown and described with respect to the detailed embodiments thereof, it will be understood by those skilled in the art that various changes in form and detail thereof may be made without departing from the spirit and the scope of the invention.

What is claimed is:

1. A method of repairing an airfoil, comprising the steps of:
   determining one or more regions of said airfoil that are likely to be damaged during a period of operation;
   creating a stress profile for said airfoil;
   selecting a patch line using said stress profile and said determination of said one or more regions likely to be damaged during a period of operation;
   providing an airfoil replacement section with a predetermined shape having a bond surface that substantially mates with said patch line;

cutting said airfoil along said patch line to remove a portion of said airfoil;

bonding said airfoil replacement section to said airfoil along said patch line; and shaping said airfoil.

2. The method of claim 1, wherein said stress profile considers dynamic, steady-state, and residual stresses.

3. The method of claim 2, wherein said patch line is selected to extend through areas having acceptable levels of stress collectively relating to said dynamic, steady-state, and residual stresses.

4. The method of claim 3, wherein said one or more regions of said airfoil that ate likely to be damaged during a period of operation are determined using empirical data.

5. The method of claim 4, wherein said patch line is selected such that said portion of said airfoil removed includes substantially all of at least one of said regions likely to be damaged during a period of operation.

6. The method of claim 1, wherein said one or more regions of said airfoil that are likely to be damaged during a period of operation are determined using empirical data.

7. The method of claim 1, wherein said replacement airfoil includes a first portion extending along said bond surface and a second portion, said first portion sized substantially the same as said airfoil along said patch line, and said second portion sized larger than said removed airfoil portion.

8. A method of repairing an airfoil, comprising the steps of:

selecting a patch line on said airfoil using a stress profile to direct said patch line through airfoil regions having acceptable stress levels;

cutting said airfoil along said patch line to remove a portion of said airfoil;

providing a standardized airfoil replacement section having a bond surface that substantially matches said patch line, wherein said replacement section shape is chosen so that one or more regions of said airfoil that are likely to be damaged during a period of operation are substantially included in said removed airfoil portion;

bonding said airfoil replacement section to said airfoil along said patch line; and shaping said airfoil.

9. The method of claim 8, wherein said stress profile considers dynamic, steady-state, and residual stresses.

10. The method of claim 9, wherein said patch line is selected to extend through said airfoil regions having acceptable levels of stress that collectively relate to said dynamic, steady-state, and residual stresses.

11. The method of claim 10, wherein said one or more regions of said airfoil that are likely to be damaged during a period of operation are determined using empirical data.

12. A method of repairing an airfoil, comprising the steps of:

determining one or more regions of said airfoil that are likely to be damaged during a period of operation;

creating a stress profile for said airfoil;

selecting a patch line using said stress profile and said determination of said one or more regions likely to be damaged during a period of operation;

providing an airfoil replacement section with a predetermined shape having a bond surface that substantially mates with said patch line;

removing a portion of said airfoil up to said patch line;

bonding said airfoil replacement section to said airfoil along said patch line; and shaping said airfoil.

* * * * *